United States Patent
Huiban

(10) Patent No.: US 11,115,354 B2
(45) Date of Patent: Sep. 7, 2021

(54) TECHNIQUE OF CO-OPERATION BETWEEN A PLURALITY OF CLIENT ENTITIES

(71) Applicant: ORANGE, Paris (FR)

(72) Inventor: Yoann Huiban, Perros Guirec (FR)

(73) Assignee: Orange, Paris (FR)

(*) Notice: Subject to any disclaimer, the term of this patent is extended or adjusted under 35 U.S.C. 154(b) by 301 days.

(21) Appl. No.: 14/766,063

(22) PCT Filed: Mar. 25, 2014

(86) PCT No.: PCT/FR2014/050701
§ 371 (c)(1),
(2) Date: Aug. 5, 2015

(87) PCT Pub. No.: WO2014/155001
PCT Pub. Date: Oct. 2, 2014

(65) Prior Publication Data
US 2016/0021034 A1 Jan. 21, 2016

(30) Foreign Application Priority Data

Mar. 29, 2013 (FR) ...................................... 1352889

(51) Int. Cl.
*H04L 12/58* (2006.01)
*H04L 29/06* (2006.01)
*H04L 29/08* (2006.01)
*H04L 15/16* (2006.01)
*A63F 13/00* (2014.01)
*G06F 15/16* (2006.01)

(52) U.S. Cl.
CPC ............ *H04L 51/04* (2013.01); *H04L 51/043* (2013.01); *H04L 51/046* (2013.01); *H04L 67/06* (2013.01); *H04L 67/34* (2013.01); *H04L 67/42* (2013.01)

(58) Field of Classification Search
CPC ......... H04L 51/04; H04L 67/42; H04L 67/06; H04L 67/34; H04L 51/046
USPC ....................................................... 709/206
See application file for complete search history.

(56) References Cited

U.S. PATENT DOCUMENTS

| 5,774,673 A * | 6/1998 | Beuk ........................ A63F 13/12 709/236 |
| 7,558,828 B1 * | 7/2009 | Panzer .................... H04L 51/04 709/205 |
| 7,995,716 B2 * | 8/2011 | Narang ................... H04M 3/53 379/88.13 |

(Continued)

OTHER PUBLICATIONS

The Written Opinion for the PCT/FR2014/050701 Application.

*Primary Examiner* — David R Lazaro
*Assistant Examiner* — Berhanu Shitayewoldetadik
(74) *Attorney, Agent, or Firm* — Haverstock & Owens LLP

(57) ABSTRACT

The invention relates to a technique of co-operation between a plurality of client entities communicating among themselves by way of at least one instantaneous-communication channel established between the client entities and said plurality. A first client entity of said plurality dispatches an executable application to at least one second client entity of said plurality by way of said at least one instantaneous-communication channel. This application is then executed by the first client entity in co-operation with an execution of said application on the second client entity.

12 Claims, 4 Drawing Sheets

(56) References Cited

U.S. PATENT DOCUMENTS

| | | | | |
|---|---|---|---|---|
| 8,280,983 B2* | 10/2012 | Lev | | G06F 16/2471 |
| | | | | 709/219 |
| 9,081,777 B1* | 7/2015 | Krawczyk | | G06F 16/41 |
| 9,911,089 B2* | 3/2018 | Saiu | | G06Q 10/0631 |
| 2001/0054070 A1* | 12/2001 | Savage | | H04L 65/4076 |
| | | | | 709/204 |
| 2002/0023134 A1* | 2/2002 | Roskowski | | H04L 65/4007 |
| | | | | 709/206 |
| 2002/0026447 A1* | 2/2002 | Matsutsuka | | G06F 16/972 |
| 2002/0055975 A1* | 5/2002 | Petrovykh | | H04M 7/003 |
| | | | | 709/205 |
| 2002/0089936 A1* | 7/2002 | Givoly | | H04L 12/1403 |
| | | | | 370/252 |
| 2002/0198943 A1* | 12/2002 | Zhuang | | H04L 67/42 |
| | | | | 709/206 |
| 2003/0185232 A1* | 10/2003 | Moore | | H04M 15/09 |
| | | | | 370/465 |
| 2004/0030750 A1* | 2/2004 | Moore | | H04M 7/0003 |
| | | | | 709/204 |
| 2004/0034860 A1* | 2/2004 | Fernando | | G06F 9/46 |
| | | | | 719/315 |
| 2004/0142709 A1* | 7/2004 | Coskun | | H04L 67/22 |
| | | | | 455/466 |
| 2004/0221031 A1* | 11/2004 | Desai | | H04L 67/42 |
| | | | | 709/224 |
| 2004/0224772 A1* | 11/2004 | Canessa | | A63F 13/335 |
| | | | | 463/42 |
| 2004/0264916 A1* | 12/2004 | Sluis | | H04N 21/43637 |
| | | | | 386/200 |
| 2005/0034079 A1* | 2/2005 | Gunasekar | | G06Q 10/10 |
| | | | | 715/753 |
| 2005/0198165 A1* | 9/2005 | Reddel | | G06Q 10/08 |
| | | | | 709/206 |
| 2005/0198167 A1* | 9/2005 | Roskowski | | H04L 51/36 |
| | | | | 709/206 |
| 2005/0198183 A1* | 9/2005 | Zilliacus | | H04M 3/527 |
| | | | | 709/207 |
| 2005/0261796 A1* | 11/2005 | Shen | | H04L 45/00 |
| | | | | 700/121 |
| 2005/0262007 A1* | 11/2005 | Beartusk | | G06Q 10/10 |
| | | | | 705/37 |
| 2006/0010205 A1* | 1/2006 | Beartusk | | G06Q 10/10 |
| | | | | 709/205 |
| 2006/0026169 A1* | 2/2006 | Pasqua | | G06F 9/5044 |
| 2006/0031510 A1* | 2/2006 | Beck | | H04L 67/327 |
| | | | | 709/226 |
| 2006/0244839 A1* | 11/2006 | Glatron | | H04N 21/47202 |
| | | | | 348/211.11 |
| 2007/0016680 A1* | 1/2007 | Burd | | H04L 67/24 |
| | | | | 709/227 |
| 2007/0118875 A1* | 5/2007 | Chow | | H04L 9/3263 |
| | | | | 726/2 |
| 2007/0124439 A1* | 5/2007 | Shah | | G06F 9/54 |
| | | | | 709/223 |
| 2007/0162589 A1* | 7/2007 | Riddle | | H04L 65/403 |
| | | | | 709/223 |
| 2007/0209054 A1* | 9/2007 | Cassanova | | H04L 51/04 |
| | | | | 725/100 |
| 2008/0043660 A1* | 2/2008 | White | | H04L 67/04 |
| | | | | 370/313 |
| 2008/0063154 A1* | 3/2008 | Tamari | | H04M 11/04 |
| | | | | 379/88.13 |
| 2008/0096588 A1* | 4/2008 | Waytena | | H04L 29/12103 |
| | | | | 455/466 |
| 2008/0271137 A1* | 10/2008 | Sinn | | H04L 12/4633 |
| | | | | 726/15 |
| 2008/0313278 A1* | 12/2008 | Hochberg | | H04L 65/602 |
| | | | | 709/204 |
| 2008/0320154 A1* | 12/2008 | Demmer | | H04W 4/20 |
| | | | | 709/229 |
| 2009/0031296 A1* | 1/2009 | Boudreau | | H04L 67/04 |
| | | | | 717/174 |
| 2009/0106367 A1* | 4/2009 | Banerjee | | G06Q 10/107 |
| | | | | 709/206 |
| 2009/0138547 A1* | 5/2009 | Boudreau | | H04L 67/303 |
| | | | | 709/203 |
| 2009/0164553 A1* | 6/2009 | Chiu | | H04L 29/125 |
| | | | | 709/202 |
| 2009/0168644 A1* | 7/2009 | Zimmet | | H04L 41/0659 |
| | | | | 370/225 |
| 2009/0199271 A1* | 8/2009 | Roskind | | H04L 63/0272 |
| | | | | 726/3 |
| 2009/0217365 A1* | 8/2009 | Daigle | | H04N 7/163 |
| | | | | 726/7 |
| 2010/0121707 A1* | 5/2010 | Goeldi | | G06Q 30/0263 |
| | | | | 705/14.49 |
| 2010/0125635 A1* | 5/2010 | Axelrod | | H04L 63/0838 |
| | | | | 709/206 |
| 2010/0287245 A1* | 11/2010 | Yang | | H04L 67/025 |
| | | | | 709/206 |
| 2010/0296641 A1* | 11/2010 | Goel | | G06Q 10/10 |
| | | | | 379/93.21 |
| 2011/0276885 A1* | 11/2011 | Gibson | | H04N 21/4131 |
| | | | | 715/734 |
| 2012/0016937 A1* | 1/2012 | Merrifield | | G06Q 50/01 |
| | | | | 709/204 |
| 2012/0143964 A1* | 6/2012 | Luca | | H04L 51/34 |
| | | | | 709/206 |
| 2012/0185561 A1* | 7/2012 | Klein | | H04L 67/02 |
| | | | | 709/217 |
| 2012/0250858 A1* | 10/2012 | Iqbal | | G06F 9/4856 |
| | | | | 380/44 |
| 2012/0290663 A1* | 11/2012 | Hsieh | | G06F 9/4856 |
| | | | | 709/206 |
| 2012/0290954 A1 | 11/2012 | Qureshi et al. | | |
| 2012/0309436 A1* | 12/2012 | Lan | | H04W 8/28 |
| | | | | 455/466 |
| 2012/0310995 A1* | 12/2012 | Subramaniam | | G06F 16/25 |
| | | | | 707/809 |
| 2012/0311329 A1* | 12/2012 | Medina | | G06F 21/606 |
| | | | | 713/168 |
| 2012/0311686 A1* | 12/2012 | Medina | | H04L 63/0807 |
| | | | | 726/7 |
| 2012/0329390 A1* | 12/2012 | Kim | | H04W 4/80 |
| | | | | 455/41.1 |
| 2013/0007150 A1* | 1/2013 | Hertz | | H04L 51/36 |
| | | | | 709/206 |
| 2013/0018701 A1* | 1/2013 | Dusig | | G06Q 30/0203 |
| | | | | 705/7.32 |
| 2013/0073634 A1* | 3/2013 | Saiu | | G06Q 10/0631 |
| | | | | 709/206 |
| 2013/0159375 A1* | 6/2013 | Perry | | A63F 13/335 |
| | | | | 709/201 |
| 2013/0244614 A1* | 9/2013 | Santamaria | | H04W 12/069 |
| | | | | 455/411 |
| 2013/0297712 A1* | 11/2013 | Park | | H04L 51/38 |
| | | | | 709/206 |
| 2013/0339454 A1* | 12/2013 | Walker | | H04L 51/04 |
| | | | | 709/206 |
| 2014/0067931 A1* | 3/2014 | Harik | | G06Q 30/01 |
| | | | | 709/204 |
| 2014/0089815 A1* | 3/2014 | Gildfind | | H04N 21/43615 |
| | | | | 715/753 |
| 2014/0156745 A1* | 6/2014 | Hua | | H04L 67/1029 |
| | | | | 709/204 |
| 2014/0250182 A1* | 9/2014 | Klemm | | H04L 67/306 |
| | | | | 709/204 |
| 2014/0330632 A1* | 11/2014 | Huddleston | | G06Q 50/01 |
| | | | | 705/14.41 |
| 2014/0364086 A1* | 12/2014 | Huang | | H04W 4/50 |
| | | | | 455/411 |
| 2015/0304364 A1* | 10/2015 | Wang | | H04L 65/1069 |
| | | | | 709/206 |

* cited by examiner

TECHNIQUE OF CO-OPERATION BETWEEN A PLURALITY OF CLIENT ENTITIES

FIELD OF THE INVENTION

The invention relates to a technique of cooperation between a plurality of client entities or terminal devices participating in an instant communication.

BACKGROUND OF THE INVENTION

Exchanges between users of terminals are increasingly being performed instantly by virtue of conversation or "chat" software. This software is getting richer in terms of functionalities and increasingly becoming instant-communication software. Thus by way of a channel associated with a conversation, users can exchange text messages and also photos, videos, files, etc.

However, the integration of new functionalities into this instant-communication software is complex. It is generally necessary to install a new version of the software at the level of the terminal or else of a server. By way of illustrative example, in the case of services developed within the framework of the RCS ("Rich Communication Suite") initiative, the updating cycles are greater than six months.

Patent document US20120290954 describes a method allowing two users communicating by way of an instant conversation to share information relating to a calendar management application. The first user dispatches an invitation to the second user to execute the calendar management application in the context of the conversation. Subsequent to agreement of the second user still in this context, a window opens up on the terminals of the two users. The first user views his own calendar as well as the unavailabilities of the second user. He can then propose a meeting to the second user. It is noted in this method that the calendar management application must be installed beforehand on both terminals or made available by way of a central server. Moreover, the information relating to the calendar management application is obtained on the basis of a centralized application server provided in the communication network. This renders the operation of the calendar management application more difficult to implement. At the level of the users' terminals, two applications are executed in an independent manner, outside of the invitation and of the transmission of an agreement or refusal: the instant-conversation application and the calendar management application. The interactions between the two applications are limited.

SUMMARY OF THE INVENTION

One of the aims of the invention is to remedy inadequacies/drawbacks of the prior art and/or to afford improvements thereto.

According to a first aspect, the subject of the invention is a method of cooperation between a plurality of client entities communicating with one another by way of at least one instant-communication channel established between the client entities of said plurality. This method comprises the following steps implemented by a first client entity of said plurality:

dispatching of an executable application to at least one second client entity of said plurality by way of said at least one instant-communication channel;

execution of said application in cooperation with an execution of said application on the second client entity.

A terminal device participating in the instant-communication service is called a client entity.

Thus, by virtue of the method of cooperation, it is possible for a user to transmit to another user participating in an instant communication an application executable in the context of the latter. A relationship of trust is established between the various participants in the instant communication. The dissemination of the application is then of viral type between the participants in the instant communication. This makes it possible for an executable application to be made available to a participant in a simple and fast manner. It is therefore not necessary for all the participants to have one and the same piece of software prior to the instant communication. Generally, the probability that all the participants have one and the same application is very low, unless the administrator of the instant-communication service defines a list of applications executable in the context of this service. Moreover, it is not necessary to search for the executable application on a server of the communication network with a view to downloading. The client pathway is thus simplified, since the participant does not have to quit the instant communication, fetch the application from an applications store, download and install the application, obtain the rights of use of the application and then return to the instant communication.

Moreover, it is not the administrator of the instant-communication service that defines a list of applications executable in the context of this service. Such a list is moreover limited on account of the memory capacities of the client entities.

It is stressed here that in patent document US20120290954 it is necessary to contact a server implementing the calendar management application in order to be able to provide this service to the participants in the instant communication. During the implementation of the method of cooperation, only the server implementing the instant-communication service intervenes to transmit the messages between the various participants. It is therefore not necessary to have a server in the network in order to implement the application.

The execution of the application is performed in the instant-communication application. Indeed, the latter has an interpreter of code instructions, such as a Javascript interpreter.

The various embodiments or realization characteristics mentioned hereinafter can be added independently or in combination with one another, to the steps of the above-defined method of cooperation.

In a particular embodiment, the cooperation between the application in the course of execution on the first client entity and that in the course of execution on the second client entity is performed by means of messages relating to the application and transmitted by way of said at least one instant-communication channel.

Data for synchronization between the cooperating executions of the application are called messages relating to the application.

It is stressed here that in patent document US20120290954 the exchanges associated with the execution of the application are not made in the context of the instant communication, that is to say by way of the instant-communication channel. Only the authorization of access to the data stored in the calendar is transmitted by means of the instant-communication channel.

On the contrary, the transmission of the messages relating to the application being performed by way of the or of one of the instant-communication channels, it is not necessary to establish other communication means dedicated to the execution of the application between the client entities. This simplifies the management of application contexts at the level of the client entity and avoids a multiplication of executing applications.

The set of the client entities participating in the instant communication thus cooperates by way of the or of one of the instant-communication channels for the execution of the application transmitted by one of them.

When more than three client entities participate in the instant communication, they thus receive the set of technical messages sent by the other client entities during the execution of the application.

According to a particular characteristic of the method, the messages relating to the application are solely processed by the application.

The messages relating to the application are transparent to the user of the client entity. This makes it possible to avoid cluttering the window associated with the instant communication with numerous text messages transmitted by the other participating users.

According to a particular characteristic of the method, the executable application is transferred in the form of a file indicating that it contains executable code.

The client entity receiving the file can thus trigger an execution of the application, subject to an agreement of the user of the receiving client entity.

According to a second aspect, the invention also relates to a client entity comprising:
an instant-communication module, designed to communicate with at least one other client entity by way of at least one established instant-communication channel;
a dispatching module, designed to dispatch an executable application to at least one other client entity by way of said at least one instant-communication channel;
an execution module, designed to execute an application in cooperation with an execution of said application on the other client entity.

The advantages stated in respect of the method according to the first aspect are transposable directly to the client entity.

In a particular embodiment, the client entity comprises a reception module, designed to receive from another client entity by way of an instant-communication channel an executable application to be executed in cooperation with said other client entity.

According to a third aspect, the invention relates furthermore to a system comprising a plurality of client entities communicating with one another by way of at least one instant-communication channel established between the client entities of said plurality, in which said client entities comprise:
an instant-communication module, designed to communicate with at least one other client entity by way of at least one established instant-communication channel,
an execution module, designed to execute an application in cooperation with an execution of said application on the other client entity,
and in which a client entity furthermore comprises a dispatching module, designed to dispatch an executable application to another client entity by way of said at least one instant-communication channel and the other client entity comprises a reception module, designed to receive from the client entity by way of said at least one instant-communication channel said executable application to be executed in cooperation with the client entity.

According to a fourth aspect, the invention relates to a program for a client entity, comprising program code instructions intended to control the execution of the steps of the above-described method of cooperation, when this program is executed by this client entity and a recording medium readable by a client entity and on which a program for a client entity is recorded.

The advantages stated in respect of the method of cooperation according to the first aspect are transposable directly to the program for a client entity and to the recording medium.

BRIEF DESCRIPTION OF THE DRAWINGS

The invention will be better understood with the aid of the following description of particular embodiments of the cooperation technique, with reference to the appended drawings in which.

DETAILED DESCRIPTION OF THE INVENTION

Figure 1:
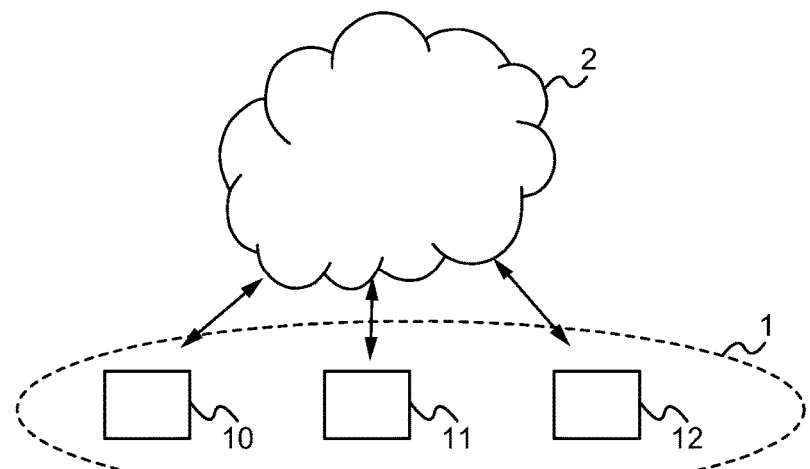
FIG. 1 represents a system of cooperation in a communication network.

FIG. 1 represents a system of cooperation 1 in a communication network. The system of cooperation 1 comprises a plurality of client entities 10, 11, 12 which communicate by way of one or more instant-communication channels established with one another. As represented in FIG. 1, the exchanges between the client entities 10, 11, 12 are performed via an access network 2.

More precisely, the client entities 10, 11, 12 execute an instant-communication application allowing them to exchange text messages, audio and/or video files, etc.

A client entity 10, 11, 12 corresponds for example to a mobile terminal, to a personal computer, to a tablet, etc.

The access network 2 corresponds for example to a wireless access network, to a mobile network, to a computer network, etc.

Hereinafter, the case is considered where the infrastructure associated with the instant-communication application complies with that defined by the RCS ("Rich Communition Suite")/Joyn™ standard of the GSMA. No limitation is attached to this type of infrastructure. By way of another example, a data exchange infrastructure in accordance with the XMPP ("Extensible Messaging and Presence Protocol") protocol also makes it possible to implement the cooperation technique.

The cooperation technique in a particular embodiment allows a first client entity to dispatch an executable application to at least one second client entity by way of the instant communication channel or channels and to thereafter execute this application in cooperation with an execution of said application on the second client entity. It is stressed here that, when the instant communication comprises more than three participants, the first client entity transmits the application to each second client entity participating in the instant communication, the execution in cooperation thereafter executing on the set of client entities (with the proviso that they have accepted this execution). The cooperation is thus understood as a cooperation on the set of client entities participating in the instant communication.

Such an executable application transmitted by way of the or of one of the instant-communication channels is subsequently called a "chatlet".

A "chatlet" is composed of instructions written in a language available innately on the set of client entities. It is for example the Javascript language.

A "chatlet" is disseminated on the initiative of one of the participants of the instant conversation destined for the other participants. This dissemination is performed by means of the file sharing functionality proposed within the framework of the instant-communication application. A type of content makes it possible to indicate to the terminals of the other participants that the file transmitted comprises executable code and is to be executed in the context of the instant communication. Code compiled on the basis of programs written in programming languages, such as the C or Java language, or interpreted code programmed in the form of scripts, such as the Javascript, Perl, Python languages, is called executable code.

The "chatlet" thereafter executes on the various client entities and, during this execution, the "chatlets" cooperate with one another so as to share information relating to the execution of the "chatlet".

In a particular embodiment, the cooperation between the "chatlet" application in the course of execution on the first client entity and that in the course of execution on the second client entity is performed by means of messages relating to this application and transmitted by way of the or of one of the instant-communication channels.

Subsequently, such messages relating to the application are called technical messages.

These technical messages are not displayed in a window associated with the instant communication open on the client entity. A technical message comprises in particular an identifier of the application app_id concerned, a type of event evt and an identifier of the user.

By way of illustration, an Applications Programming Interface API is made available to the users of the client entities and comprises a set of elementary functions on the basis of which a user can program a "chatlet" application. The elementary functions comprise:
  elementary functions specific to the instant communication, such as a sending of technical messages, of text messages associated with the instant communication, access to a list of participants in the instant communication, etc.
  elementary functions making it possible to access functions specific to the terminal of the participant, such as a geolocation, a sending of SMS short messages (for "Short Message Service"), a telephone call function, a calendar of the user of the terminal, etc.
  other functions, for example billing.

Once this "chatlet" application has been programmed, it is for example made available to the user of the client entity by way of an applications store. When he accesses this applications store, the user can thus select a "chatlet" application that he wishes to execute in cooperation with the other participants in the instant communication.

The "chatlet" API applications programming interfaces can also be native and integrated into the RCS standard.

Figure 2A:
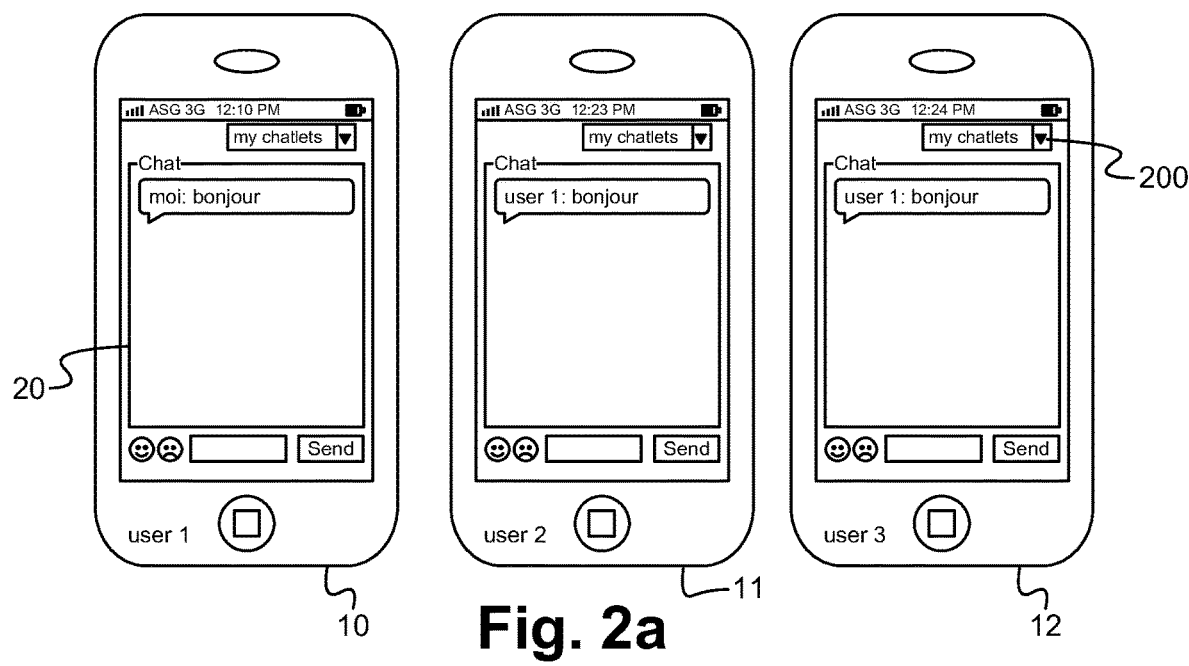
FIGS. 2a-2e illustrate an exemplary implementation of the method of cooperation according to a particular embodiment of the invention.

By way of illustrative example, FIG. 2a represents the three client entities 10, 11, 12. The application store is accessible by means of a scrolldown menu 200 situated in an area of the screen 20 of the client entity 10.

We shall now describe the method of cooperation, such as it is implemented by a client entity 10 in a particular embodiment, in conjunction with FIG. 3 and FIGS. 2a-2e.

In a first phase φ1, an instant communication is established between the users of the client entities 10, 11, 12. The instant-communication application is for example an RCS/Joyn application, in "One to One" or "Group Chat" mode for example.

The case considered subsequently is one where a single instant-communication channel is established.

The client entity 10 transmits a first text message M1 destined for the two client entities 11, 12, so as to invite them to participate in an instant communication.

FIG. 2a represents the various screens of the client entities 10, 11, 12 on completion of this transmission of the message M1 for the client entity 10 and the reception of the message M1 for the client entities 11, 12.

In response, the client entity 11 transmits a second text message M2 destined for the client entities 10, 11.

The instant-communication channel is then established between the three client entities 10, 11, 12. Any text message sent by one of the client entities is displayed on the screen of the other client entities participating in the instant communication. In order not to overload the description, no other exchange of text messages is described within the framework of this illustrative example. No limitation is attached to the number of text messages exchanged prior to the implementation of the later phases.

In a second phase φ2, the user of the client entity 10 selects an application that he wishes to execute in cooperation with the other client entities 11, 12 participating in the instant communication. In this illustrative example, the same client entity is at the origin of the establishment of the instant communication and of the selection of the application to be executed in cooperation. No limitation is attached to this example. A user of another client entity can also implement this second phase.

More precisely, in a step E1, the user of the client entity 10 selects from the scrolldown menu 200 the application to be transferred to the other client entities 11, 12 for execution in cooperation.

Figure 2B:
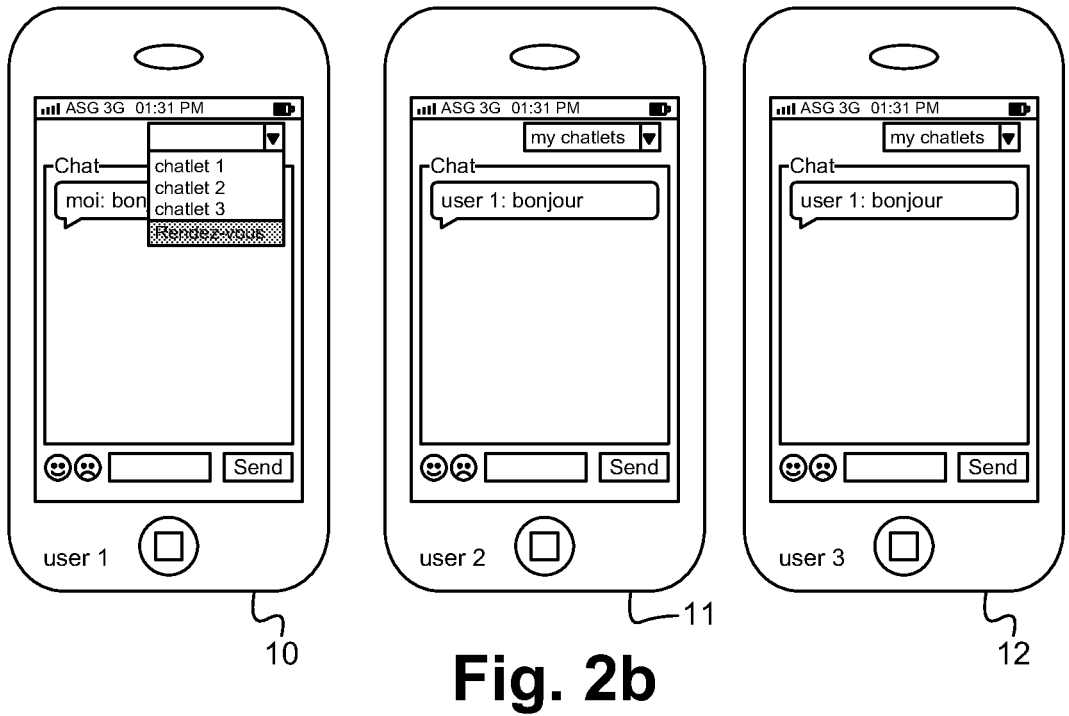

FIG. 2b represents the various screens of the client entities 10, 11, 12 on completion of this second phase. The screens of the client entities 11, 12 are unchanged. The case considered subsequently is one where the user of the client entity 10 selects a meeting application.

In a third phase φ3, the application to be executed in cooperation is shared by the client entity 10 with the other client entities 11, 12.

More precisely, the client entity 10 transmits to the client entities 11, 12 the selected application in executable form by means of a file transfer message M3. This file transfer is for example carried out by means of the "File Transfer" functionality defined by the RCS standard.

The message M3 is received by the client entity 11 in a step F1. Still in this step F1, the client entity 11 determines by means of the type of content that the file transmitted is a file to be executed in the context of the instant communication.

In a step F2, the user of the client entity 11 accepts or otherwise the execution of the file transmitted, that is to say of the application received, by means of the man-machine interface of the client entity.

The client entity 12 also implements a step G1 similar to step F1 and a step G2 similar to step F2.

Figure 2C:
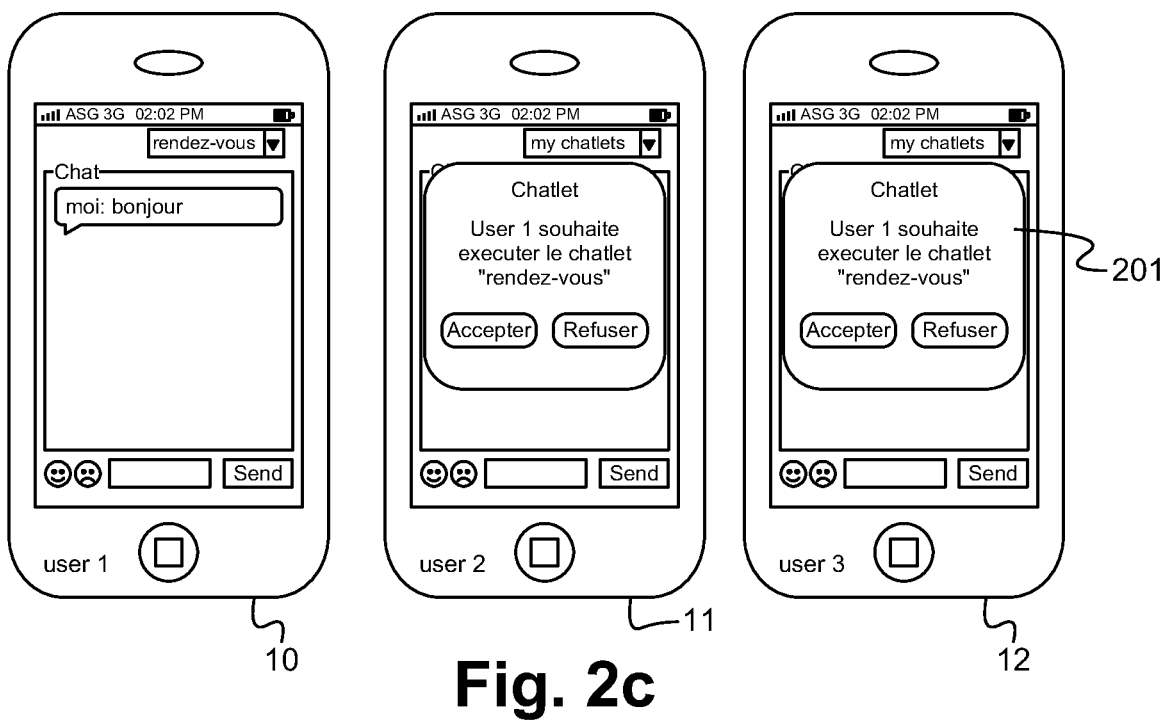

FIG. 2c represents the screens of the client entities 10, 11, 12 on completion of this third phase. The user is interrogated in an area 201 of the screens of the client entities 11, 12 which is associated with an area reserved for the instant communication.

The case considered subsequently is one where the users of the client entities 11, 12 have accepted the execution of the meeting application.

In a fourth phase φ4, the execution of the application in cooperation is initiated.

More precisely, subsequent to the acceptance of the user of the client entity 11, the latter transmits a technical message M4, that is to say a message relating to the selected application, destined for the other two client entities 10, 12. This technical message M4 comprises in particular an identifier of the application app_id selected and a type of event evt indicating that the execution of the selected application is accepted. It is recalled here that such technical messages are solely destined for the application concerned and are not displayed on the screens of the client entities. The client entity 12 also transmits a technical message M5, similar to the technical message M4, destined for the client entities 10, 11.

On completion of these various exchanges, an application selected by one of the users has been distributed to the other users participating in the instant communication. These latter thus do not need either to have this application on their terminal beforehand or to contact a server in the network to obtain this application. Moreover, these exchanges being performed in the context of the instant communication, a relationship of trust is established between the various participants. It is also simpler to introduce a new application by virtue of the application programming interface: a user can thus program an application which satisfies his needs and share it with users participating in the instant communication for an execution in cooperation.

Still in this fourth phase φ4, in a step E2, the user of the client entity 10 fills in the meeting proposal, for example the place and time of meeting, by means of the man-machine interface. The meeting application in the course of execution on the client entity 10 triggers the dispatching of a technical message M6 destined for the other two client entities 11, 12. This technical message M6 comprises in particular an identifier of the application app_id in the course of execution and a type of event evt indicating the place and time of the meeting. This technical message M6 is received in a step F3 by the client entity 11. The meeting application in the course of execution on the client entity 11 processes this technical message M6 and displays in a screen area dedicated to the application the meeting proposal sent by the user of the client entity 10.

Figure 2D:
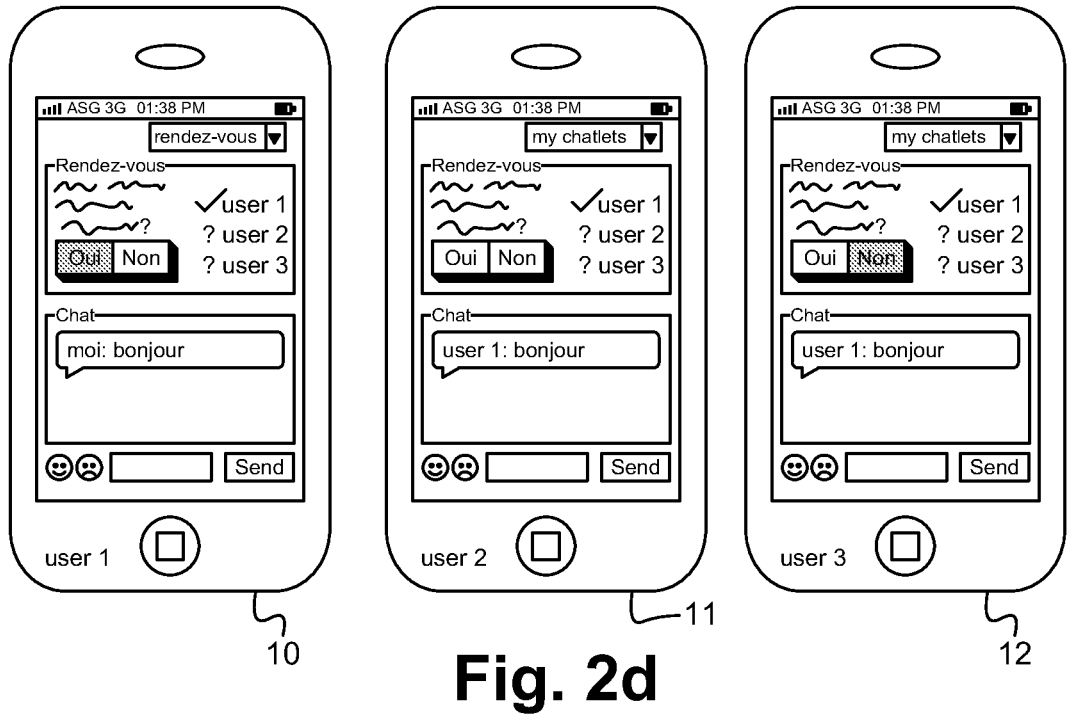

FIG. 2d represents the screens of the client entities. The display area 202 of the screen is dedicated to the interaction with the user. In a particular embodiment, this area 202 is distinct from the area reserved for instant communication, so as not to clutter the message log. This display area 202 comprises:

a reminder of the place and time of the meeting,
  two buttons, "yes" and "no", allowing the user to provide his response, and
  a summary of an agreement or otherwise for each user participating in the instant communication.

The summary indicates an agreement, flagged by a ticked box, for the user of the client entity 10 and an absence of information, flagged by a question mark, for the users of the client entities 11, 12.

In a fifth phase φ5, the execution of the application in cooperation on the various client entities continues and provides a final result.

The client entity 12 transmits in a step G4 a response of its user in a technical message M7. The technical message M7 comprises in particular an identifier of the application app_id in the course of execution and a type of event evt indicating the response. The case considered subsequently is one where the response of the user of the client entity 12 is negative.

The technical message M7 is received by the client entity 10 in a step E3. The client entity 10 then updates the display area 202, in particular the summary, as a function of this technical message M7, so as to add thereto the response of the user of the client entity 12. The technical message M7 is also received by the client entity 11 in a step F4, similar to step E3. The client entity 11 then updates the display area 202, in particular the summary, as a function of this technical message M7, so as to add thereto the response of the user of the client entity 12.

The client entity 11 transmits in a step F4, similar to step G4, a response of its user in a technical message M8. The technical message M8 is similar to the technical message M7. The case considered subsequently is one where the response of the user of the client entity 11 is positive.

The technical message M8 is received by the client entity 10 in a step E4. The client entity 10 then updates the display area 202, in particular the summary, as a function of this technical message M8, so as to add thereto the response of the user of the client entity 11. The technical message M8 is also received by the client entity 11 in a step G5, similar to step E4. The client entity 12 then updates the display area 202, in particular the summary, as a function of this technical message M7, so as to add thereto the response of the user of the client entity 12.

Figure 2E:
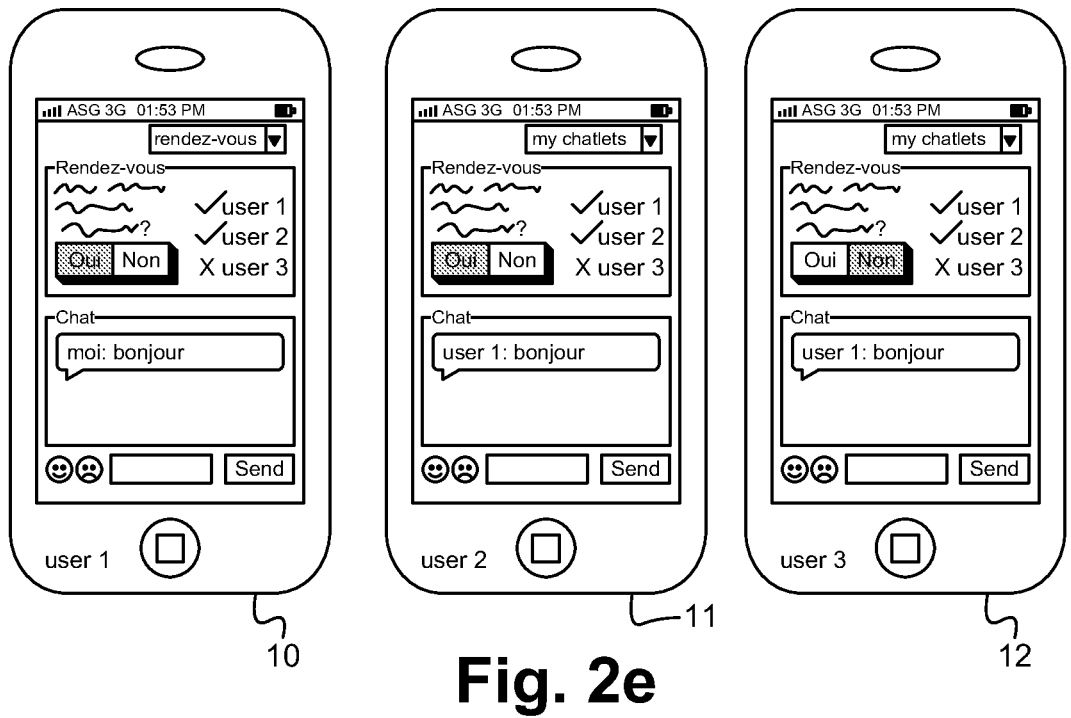
Figure 3:
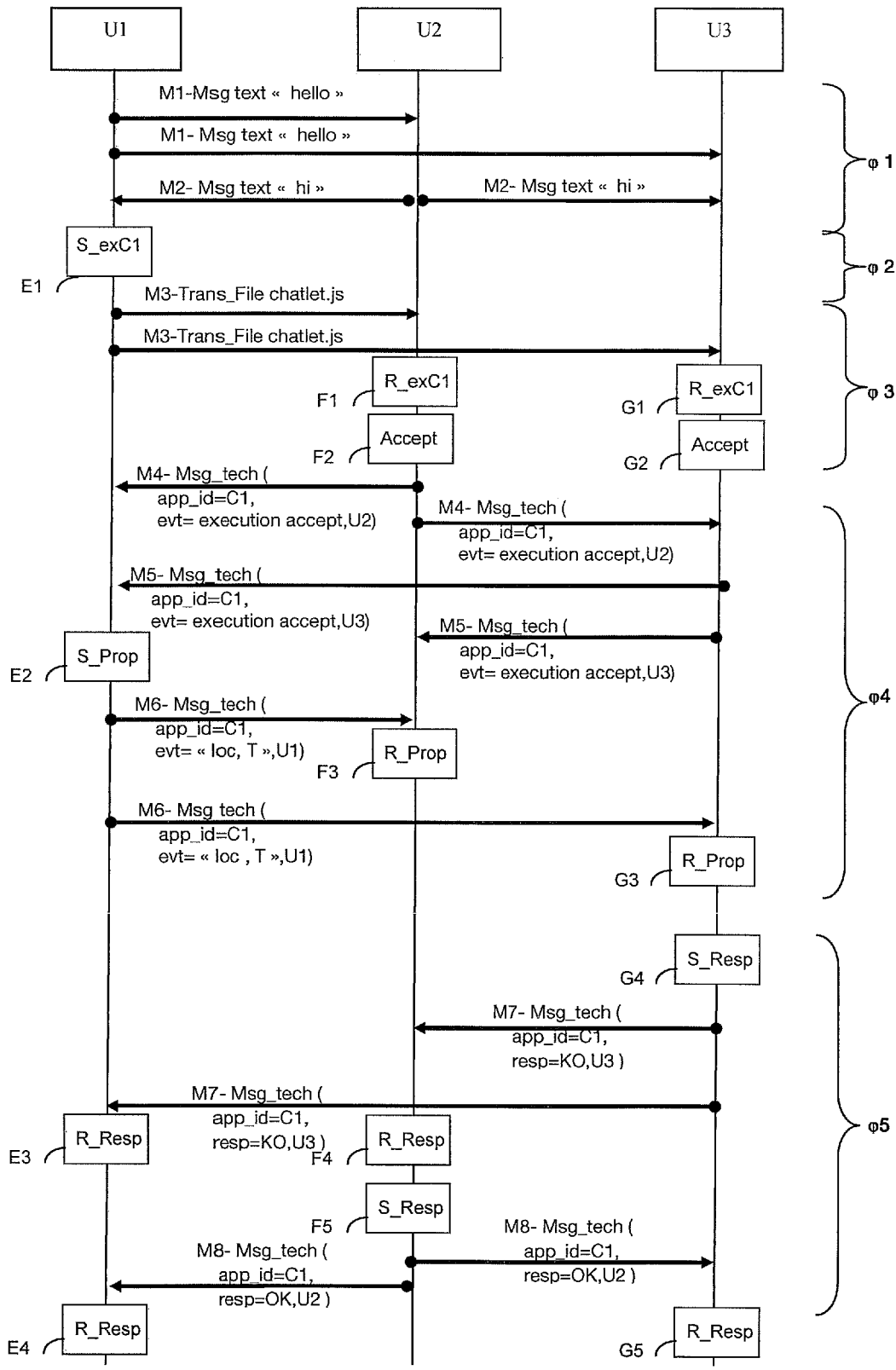
FIG. 3 illustrates the exchanges between client entities during the implementation of the method of cooperation according to a particular mode of the invention.

FIG. 2e represent the screens of the client entities 10, 11, 12 on completion of this fifth phase. The summary present in the display area 202 indicates an agreement, flagged by a ticked box, for the users of the client entities 10,11 and a refusal, flagged by a cross, for the user of the client entity 12. It is thus noted that the exchanges between the client entities have been performed in a manner transparent to the various users and that the display of the summary allows these latter to obtain the final result. If the users had desired to confer in order to set up this meeting, numerous exchanges would have occurred in the window dedicated to the display of the text messages and an overview would have been difficult to obtain.

Other embodiments are also conceivable while remaining within the framework of the method of cooperation described above.

The description has been given for an exemplary meeting application. No limitation is attached to this application. The method of cooperation can advantageously be implemented for other "chatlet" applications, mentioned here by way of nonlimiting examples:

restaurant reservation: this application allows users participating in an instant communication to define and then to meet physically in a restaurant. The application makes it possible to define the closest restaurant as a function of their respective geographical locations and to immediately determine the number of participants. Optionally, the application can provide an interaction with a server, allowing partner restaurants to propose offers to the participants.

whiteboard: this application allows a user to share a road map with the other participants and to indicate thereon the position of a place of interest, such as his residence. Another participant can also indicate thereon landmarks, making it possible to get to the place of interest.

conference bridge: a user wishes to orally transmit the indications making it possible to reach the place of interest. He can initiate a group telephone call to the participants of the instant communication.

on-line game: users participating in an instant communication provide responses to a game, for example a quiz.

The client entities implementing the method of cooperation thus comprise a set of functions:

exchange of messages relating to the "chatlet" application or technical messages and management of such messages;

use of a file transfer function to transmit executable code;

execution of "chatlet" applications, transmitted if appropriate on the basis of another client entity;

integration of the "chatlet" applications into the native graphical interfaces.

It is recalled here that the "chatlet" applications can be developed by the client entities on top of the current API RCS applications programming interfaces or else be integrated in a native manner into the RCS standard.

Figure 4:
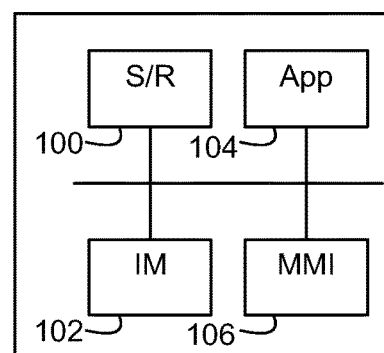
FIG. 4 represents a client entity according to a particular mode of the invention.

We shall now describe a client entity in a particular embodiment of the invention with reference to FIG. 4. Such a client entity 10 comprises in particular:

a communication module 100, designed to communicate with other client entities in a communication network;

a man-machine interface module 106, designed to communicate with a user of the client entity;

an instant-communication module 102;

a module 104 for executing a "chatlet" application in cooperation with at least one other client entity participating in an instant communication.

The instant-communication module 102 is designed to establish one or more instant-communication channels with one or more other client entities, to exchange text messages between the client entities participating in the instant communication by way of the instant-communication channel or channels and to share files between said entities.

The instant-communication module 102 is furthermore designed to dispatch an executable application stored in a memory area to another client entity by way of the or of one of the instant-communication channels and to request an execution of this application in cooperation with an execution of the latter on the other client entity. Of course, when more than three client entities participate in the instant communication, the module 102 is designed to dispatch the executable application to each of the other client entities participating in the instant communication and the module 104 is designed to execute the application in cooperation for the set of client entities participating in the instant communication.

In a particular embodiment, the instant-communication module 102 is furthermore designed to transmit a technical message received from another client entity to the module 104 for executing the "chatlet" application.

The instant-communication module 102 is furthermore designed to receive an executable application from another client entity by way of the or of one of the instant-communication channels and to request an execution of this application in cooperation with an execution of the latter on the other client entity. When more than three client entities participate in the instant communication, the execution of this application is performed for the set of client entities participating in the instant communication.

The invention is implemented by means of software components and/or hardware components. In this regard, the term "module" can correspond in this document either to a software component, or to a hardware component or to a set of hardware components and/or software components which is able to implement a function or a set of functions, according to what is described above in respect of the module concerned.

A software component corresponds to one or more computer programs, one or more subprograms of a program, or more generally to any element of a program or of a piece of software. Such a software component is stored in memory and then loaded and executed by a data processor of a physical entity and is able to access the hardware resources of this physical entity (memories, recording media, communication buses, input/output electronic cards, user interfaces, etc).

In the same manner, a hardware component corresponds to any element of a hardware set. It may or may not be a programmable hardware component, with or without integrated processor for the execution of software. It is for example an integrated circuit, a chip card, an electronic card for the execution of firmware, etc.

In a particular embodiment, the modules 102, 104 are designed to implement the method described above. They are preferably software modules comprising software instructions for executing the steps, implemented by a client entity, of the above-described method of cooperation. The invention therefore also relates to:

a program for a client entity, comprising program code instructions intended to control the execution of the steps of the above-described method of cooperation, when said program is executed by said client entity;

a recording medium readable by a client entity and on which the program for a client entity is recorded.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

The invention also relates to a system 1 comprising a plurality of client entities communicating with one another by way of at least one instant-communication channel established between the client entities of said plurality. In this system, the client entities comprise:

an instant-communication module 102, designed to communicate with at least one other client entity by way of at least one established instant-communication channel, an execution module 104, designed to execute an application in cooperation with an execution of said application on the other client entity.

A first client entity furthermore comprises a dispatching module 100, designed to dispatch an executable application to at least one second client entity by way of the or of one of the instant-communication channels.

The second client entity comprises a reception module, designed to receive from the first client entity by way of the instant-communication channel or channels this executable application to be executed in cooperation with the first client entity, and if appropriate other second client entities participating in the instant communication.

The invention claimed is:

1. A method of cooperation between a plurality of client entities communicating with one another by way of at least one instant-communication channel established between the client entities of said plurality, said method comprising the following steps implemented by a first client entity of said plurality:

dispatching of an executable application to at least one second client entity of said plurality by way of said at least one instant-communication channel established between the client entities of said plurality for execution of an instant-communication application, said dispatching being performed while said instant-communication application is running and via file sharing within the framework of the instant-communication application;

executing of said application in cooperation with an execution of said application on the second client entity;

in which the cooperation between the application in the course of execution on the first client entity and that in the course of execution on the second client entity is performed by means of messages relating to the application and transmitted while said instant-communication application is running by way of said at least one instant-communication channel established for execution of said instant-communication application, wherein messages relating to the application in the course of execution and messages relating to the instant-communication application are transmitted on said at-least one instant-communication channel and messages relating to the application are solely destined for the application concerned.

2. The method of cooperation as claimed in claim 1, in which the messages relating to the application are solely processed by the application.

3. The method of cooperation as claimed in claim 1, in which the executable application is transferred in the form of a file indicating that it contains executable code.

4. A client entity comprising:
a processor; and
a non-transitory computer-readable memory storing an instant-communication module, a dispatching module and an execution module, wherein when executed by the processor:
the instant-communication module communicates with at least one other client entity by way of at least one established instant-communication channel;
the dispatching module dispatches an executable application to at least one other client entity by way of said at least one instant-communication channel established between the client entities of said plurality for execution of an instant-communication application, said dispatching being performed while said instant-communication application is running and via file sharing within the framework of the instant-communication application; and
the execution module executes an application in cooperation with an execution of said application on the other client entity;

in which the cooperation between the application in the course of execution on the client entity and that in the course of execution on the at least one other client entity is performed by means of messages relating to the application and transmitted while said instant-communication application is running by way of said at least one instant-communication channel established for execution of said instant-communication application, wherein messages relating to the application in the course of execution and messages relating to the instant-communication application are transmitted on said at-least one instant-communication channel and messages relating to the application are solely destined for the application concerned.

5. The client entity as claimed in claim 4, furthermore comprising a reception module, designed to receive from another client entity by way of an instant-communication channel an executable application to be executed in cooperation with said other client entity.

6. A system comprising a plurality of client entities communicating with one another by way of at least one instant-communication channel established between the client entities of said plurality, in which said client entities comprise:
a processor; and
a non-transitory computer-readable memory storing an instant-communication module, a dispatching module and an execution module, wherein when executed by the processor:
the instant-communication module communicates with at least one other client entity by way of at least one established instant-communication channel established between the client entities of said plurality for execution of an instant-communication application, said dispatching being performed while said instant-communication application is running and via file sharing within the framework of the instant-communication application, and
the execution module executes an application in cooperation with an execution of said application on the other client entity, in which the cooperation between the application in the course of execution on the first client entity and that in the course of execution on the second client entity is performed by means of messages relating to the application and transmitted while said instant-communication application is running by way of said at least one instant-communication channel, wherein messages relating to the application in the course of execution and messages relating to the instant-communication application are transmitted on said at-least one instant-communication channel established for execution of said instant-communication application and messages relating to the application are solely destined for the application concerned, and in which a client entity furthermore comprises a dispatching module, designed to dispatch an executable application to another client entity by way of said at least one instant-communication channel and the other client entity comprises a reception module, designed to receive from the client entity by way of said at least one instant-communication channel said executable application to be executed in cooperation with the client entity.

7. A program stored on a non-transitory computer readable medium for a client entity, comprising program code instructions which, when said program is executed by said client entity, controls cooperation between a plurality of client entities communicating with one another by way of at least one instant-communication channel established between the client entities of said plurality, said method comprising the following steps:

dispatching of an executable application to at least one second client entity of said plurality by way of said at least one instant-communication channel established between the client entities of said plurality for execution of an instant-communication application, said dispatching being performed while said instant-communication application is running and via file sharing within the framework of the instant-communication application;

execution of said application in cooperation with an execution of said application on the second client entity;

in which the cooperation between the application in the course of execution on the first client entity and that in the course of execution on the second client entity is performed by means of messages relating to the application and transmitted while said instant-communication application is running by way of said at least one instant-communication channel established for execution of said instant-communication application;

wherein messages relating to the application in the course of execution and messages relating to the instant-communication application are transmitted on said at-least one instant-communication channel and messages relating to the application are solely destined for the application concerned.

8. The program for a client entity as claimed in claim 7, in which the messages relating to the application are solely processed by the application.

9. The program for a client entity as claimed in claim 7, in which the executable application is transferred in the form of a file indicating that it contains executable code.

10. A non-transitory computer readable medium recording medium readable by a client entity comprising program code instructions which, when said program is executed by said client entity, controls cooperation between a plurality of client entities communicating with one another by way of at least one instant-communication channel established between the client entities of said plurality, said method comprising the following steps:

dispatching of an executable application to at least one second client entity of said plurality by way of said at least one instant-communication channel established between the client entities of said plurality for execution of an instant-communication application, said dispatching being performed while said instant-communication application is running and via file sharing within the framework of the instant-communication application;

execution of said application in cooperation with an execution of said application on the second client entity;

in which the cooperation between the application in the course of execution on the first client entity and that in the course of execution on the second client entity is performed by means of messages relating to the application and transmitted while said instant-communication application is running by way of said at least one instant-communication channel established for execution of said instant-communication application;

wherein messages relating to the application in the course of execution and messages relating to the instant-communication application are transmitted on said at-least one instant-communication channel and messages relating to the application are solely destined for the application concerned.

11. The recording medium as claimed in claim 10, in which the messages relating to the application are solely processed by the application.

12. The recording medium as claimed in claim 10, in which the executable application is transferred in the form of a file indicating that it contains executable code.

* * * * *